(12) United States Patent
Taylor et al.

(10) Patent No.: US 10,519,963 B2
(45) Date of Patent: Dec. 31, 2019

(54) ENGINE BLEED AIR SYSTEM WITH WASTE GATE VALVE FOR COMPRESSOR SURGE MANAGEMENT

(71) Applicant: United Technologies Corporation, Farmington, CT (US)

(72) Inventors: Stephen H. Taylor, East Hartford, CT (US); Charles E. Lents, Amston, CT (US); Gabriel L. Suciu, Glastonbury, CT (US); Brian D. Merry, Andover, CT (US); Jesse M. Chandler, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 644 days.

(21) Appl. No.: 15/186,739

(22) Filed: Jun. 20, 2016

(65) Prior Publication Data

US 2017/0363099 A1    Dec. 21, 2017

(51) Int. Cl.
| | |
|---|---|
| *F02C 6/08* | (2006.01) |
| *F04D 27/02* | (2006.01) |
| *F01D 5/02* | (2006.01) |
| *F01D 15/08* | (2006.01) |
| *F01D 15/12* | (2006.01) |

(Continued)

(52) U.S. Cl.
CPC ........... *F04D 27/0207* (2013.01); *F01D 5/02* (2013.01); *F01D 15/08* (2013.01); *F01D 15/12* (2013.01); *F01D 17/145* (2013.01); *F02C 6/08* (2013.01); *F02C 9/18* (2013.01); *F04D 25/06* (2013.01); *F04D 27/009* (2013.01); *F04D 29/321* (2013.01); *F05D 2220/32* (2013.01); *F05D 2260/4031* (2013.01); *F05D 2260/606* (2013.01); *F05D 2270/101* (2013.01); *F05D 2270/306* (2013.01)

(58) Field of Classification Search
CPC .. F04D 27/0207; F04D 27/02; F04D 27/0215; F04D 27/009; F01D 17/145; F02C 9/16; F02C 9/18; F02C 6/00; F02C 6/08; F05D 2270/101
See application file for complete search history.

(56) References Cited

U.S. PATENT DOCUMENTS

| | | |
|---|---|---|
| 2,734,356 A | 2/1956 | Kleinhans |
| 4,149,371 A | 4/1979 | Spraker et al. |

(Continued)

OTHER PUBLICATIONS

European Search Report for EP Application No. 17176946.6 dated Nov. 7, 2017.

*Primary Examiner* — Steven M Sutherland

(74) *Attorney, Agent, or Firm* — Carlson, Gaskey & Olds, P.C.

(57) ABSTRACT

A gas turbine engine includes a main engine compressor section. A booster compressor changes a pressure of airflow received from the main engine compressor section to a pressure desired for a pneumatic system. The booster compressor is configured to operate at airflow conditions greater than a demand of the pneumatic system. An exhaust valve controls airflow between an exhaust outlet and an outlet passage to the pneumatic system. The exhaust valve is operable to exhaust airflow from the booster compressor in excess of the demand of the pneumatic system. A bleed air system for a gas turbine engine and a method of controlling engine bleed airflow are also disclosed.

11 Claims, 3 Drawing Sheets

(51) Int. Cl.
*F01D 17/14* (2006.01)
*F04D 29/32* (2006.01)
*F04D 27/00* (2006.01)
*F04D 25/06* (2006.01)
*F02C 9/18* (2006.01)

(56) References Cited

U.S. PATENT DOCUMENTS

| | | |
|---|---|---|
| 5,137,230 A | 8/1992 | Coffinberry |
| 6,305,156 B1 * | 10/2001 | Lui .................... B64D 13/06 454/76 |
| 7,049,019 B2 | 5/2006 | Tsunoda |
| 8,904,805 B2 | 12/2014 | Hipsky et al. |
| 8,955,794 B2 | 2/2015 | Mackin et al. |
| 8,967,528 B2 | 3/2015 | Mackin et al. |
| 9,062,604 B2 | 6/2015 | DeFrancesco |
| 9,163,562 B2 | 10/2015 | Suciu et al. |
| 2010/0107594 A1 | 5/2010 | Coffinberry et al. |
| 2012/0180509 A1 | 7/2012 | DeFrancesco |
| 2013/0040545 A1 | 2/2013 | Finney |
| 2013/0086922 A1 | 4/2013 | Suciu et al. |
| 2014/0165588 A1 | 6/2014 | Snape et al. |
| 2014/0196469 A1 | 7/2014 | Finney et al. |
| 2014/0250898 A1 | 9/2014 | Mackin et al. |
| 2014/0352315 A1 | 12/2014 | Diaz |
| 2015/0065023 A1 | 3/2015 | Bruno |
| 2015/0121842 A1 | 5/2015 | Moes |
| 2015/0275758 A1 | 10/2015 | Foutch et al. |

\* cited by examiner

ENGINE BLEED AIR SYSTEM WITH WASTE GATE VALVE FOR COMPRESSOR SURGE MANAGEMENT

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section.

Pneumatic systems of the aircraft utilize engine bleed air for pneumatic power. The engine bleed air is obtained from locations within the compressor section to provide air at pressures required by the pneumatic system. Pressures within the compressor section vary during engine operating cycle. At lower engine power settings pressures within the compressor section may closely match demand, however at higher engine power settings, pressures at the same compressor location may greatly exceed demand. For this reason, engine bleed air is obtained from different locations within the compressor section depending on the current engine operating conditions in an effort to maintain engine efficiency. Even using bleed air from different locations, the variation of pressures can create difficulties in matching the demand of the pneumatic system. The difference between demand of the pneumatic system and engine bleed air pressures can reduce engine operating efficiency.

SUMMARY

In a featured embodiment, a gas turbine engine includes a main engine compressor section. A booster compressor changes a pressure of airflow received from the main engine compressor section to a pressure desired for a pneumatic system. The booster compressor is configured to operate at airflow conditions greater than a demand of the pneumatic system. An exhaust valve controls airflow between an exhaust outlet and an outlet passage to the pneumatic system. The exhaust valve is operable to exhaust airflow from the booster compressor in excess of the demand of the pneumatic system.

In another embodiment according to the previous embodiment, the booster compressor is driven by one of an output shaft of a gearbox and an electric motor.

In another embodiment according to any of the previous embodiments, the main engine compressor includes a low pressure air source that communicates airflow to the booster compressor at a pressure less than the demand of the pneumatic system.

In another embodiment according to any of the previous embodiments, includes a turbine coupled to drive the booster compressor. The turbine is driven by airflow from the main engine compressor section.

In another embodiment according to any of the previous embodiments, the turbine is driven by a high pressure air source separate from a source of air pressure in communication with the booster compressor.

In another embodiment according to any of the previous embodiments, airflow exhausted from the turbine is mixed with airflow from the outlet of the booster compressor and the exhaust valve is upstream of a junction combining airflow from the booster compressor and the turbine.

In another embodiment according to any of the previous embodiments, airflow exhausted from the turbine is mixed with airflow from the outlet of the booster compressor and the exhaust valve is downstream of a junction combining airflow from the booster compressor and the turbine.

In another embodiment according to any of the previous embodiments, a second exhaust valve is provided between a turbine outlet and the junction combining airflow from the booster compressor and the turbine. The second exhaust valve exhausts excess airflow from the turbine such that the turbine may operate at a flow rate in excess of the demand by the pneumatic system.

In another embodiment according to any of the previous embodiments, a turbine control valve upstream of a turbine inlet for controlling operation of the turbine by controlling airflow communicated to the turbine inlet from the main engine compressor section.

In another featured embodiment, a bleed air system for a gas turbine engine includes a booster compressor for changing a pressure of airflow received from a main engine compressor section to a pressure desired for a pneumatic system. The booster compressor may operate at airflow conditions greater than a demand of the pneumatic system. An exhaust valve controls airflow between an exhaust outlet and an outlet passage to the pneumatic system. The exhaust valve is operable to exhaust airflow from the booster compressor in excess of the demand of the pneumatic system.

In another embodiment according to the previous embodiment, the booster compressor is driven by either an output shaft of a gearbox or an electric motor.

In another embodiment according to any of the previous embodiments, includes a turbine coupled to drive the booster compressor. The turbine is driven by airflow from the main engine compressor section.

In another embodiment according to any of the previous embodiments, airflow exhausted from the turbine is mixed with airflow from the outlet of the booster compressor and the exhaust valve is upstream of a junction combining airflow from the booster compressor and the turbine.

In another embodiment according to any of the previous embodiments, airflow exhausted from the turbine is mixed with airflow from the outlet of the booster compressor and the exhaust valve is downstream of a junction combining airflow from the booster compressor and the turbine.

In another embodiment according to any of the previous embodiments, a second exhaust valve is provided between a turbine outlet and the junction combining airflow from the booster compressor and the turbine. The second exhaust valve exhausts excess airflow from the turbine such that the turbine may operate at a flow rate in excess of the demand of the pneumatic system.

In another embodiment according to any of the previous embodiments, includes a turbine control valve upstream of a turbine inlet for controlling operation of the turbine by controlling airflow communicated to the turbine inlet from the main engine compressor section.

In another featured embodiment, a method of controlling engine bleed airflow includes configuring a booster compressor to receive engine bleed air from a main compressor section of gas turbine engine. The engine bleed air compressed from the main compressor with the booster compressor and supplying the compressed engine bleed air to a pneumatic system according to a demand of the pneumatic system. Airflow is exhausted in excess of the demand through an exhaust valve such that the booster compressor operates at airflows exceeding the demand of the pneumatic system for at least one engine operating condition.

In another embodiment according to the previous embodiment, includes mixing airflow from a turbine driving the booster compressor with airflow from the booster compressor and exhausting excess airflow upstream of a junction combining airflow from the booster compressor and the turbine.

In another embodiment according to any of the previous embodiments, includes mixing airflow from a turbine driving the booster compressor with airflow from the booster compressor and exhausting excess airflow downstream of a junction combining airflow from the booster compressor and the turbine.

In another embodiment according to any of the previous embodiments, includes exhausting a portion of airflow with a second exhaust valve at a point between a turbine outlet and the junction combining airflow from the booster compressor and the turbine, wherein excess airflow is selectively exhausted such that the turbine may operate at airflows in excess of the demand of the pneumatic system.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
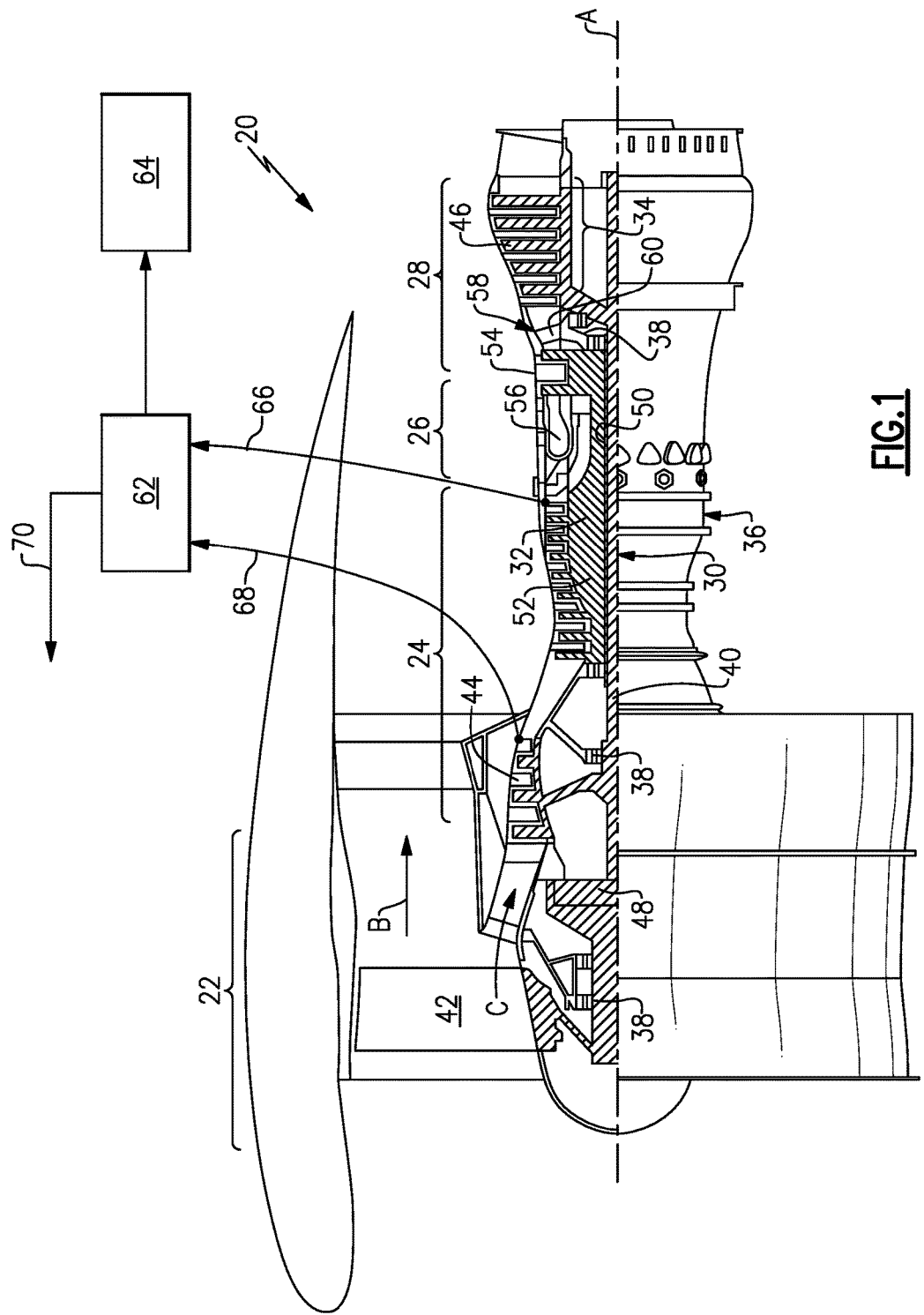
FIG. 1 schematically shows an example gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high-energy exhaust gas stream that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high-energy exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second. The disclosed fan pressure ratio and fan tip speed is determined for engine operating conditions corresponding with aircraft take off operation.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Gas turbine engines designs are seeking to increase overall efficiency by generating higher overall pressure ratios. By achieving higher overall pressure ratios, increased levels of performance and efficiency may be achieved. However, challenges are raised in that the parts and components associated with a high pressure turbine require additional cooling air as the overall pressure ratio increases.

The example engine 20 includes an engine bleed air system 62 that supplies engine bleed air to pneumatic systems schematically illustrated at 64. The pneumatic system 64 can include environmental control system as well as other aircraft system that utilized airflow. The pneumatic system 64 utilizes air at within a defined range of pressures and temperatures to operate auxiliary systems and cooling systems of the engine and aboard the aircraft. The airflow required to operate the pneumatic system 64 is drawn from the engine 20. Specifically, airflow for the pneumatic system 64 is drawn from the compressor section 24 of the main engine 20.

Instead of attempting to match pneumatic system demand with airflow and pressures at a specific location within the compressor section 24, the example engine 20 includes an engine bleed air system 62 that increases pressures from lower pressure locations in the engine 20 to pressures required for operation of the pneumatic system 64. During engine operation, airflow is supplied to the engine bleed air system 62 and then passed to the pneumatic system 64.

Airflow from the main compressor section 24 varies in pressure and temperature depending on the current engine operating condition. In some instances, bleed air may be drawn from the compressor section 24 and be suitable for use in the pneumatic system without conditioning. In other circumstances, the airflow provided by the main compressor section 24 is well above the pressures and temperatures required by the pneumatic system. Accordingly, the example bleed air system 62 draws air flow from a position in the main compressor section 24 determined to always be below the pressures required by the pneumatic system 64. The engine bleed air system 62 increases the pressures of the airflow to that required by the pneumatic system 64.

Airflow supplied from the main compressor section 24 will vary depending on current engine operation. Accordingly, the varying input airflow and pressures can result in airflow and pressures beyond what is required by the pneumatic system 64. The variation in incoming airflow and pressure is accommodated by the disclosed engine bleed air system 62 to provide airflows and pressure within acceptable ranges while enabling operation within a stable operating range.

Figure 2:
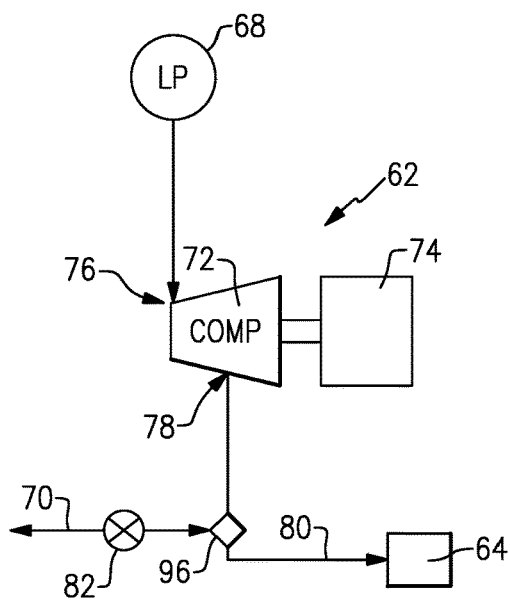
FIG. 2 schematically shows an example engine bleed air system embodiment.

Referring to FIG. 2 with continued reference to FIG. 1, the example engine bleed air system 62 includes a booster compressor 72 that is driven by a drive 74. In one example, the drive 74 comprises an electric motor. In another example, the drive 74 comprises a portion of an accessory gearbox driven by a shaft of the engine 20. It should be understood, that the example drive 74 may be any mechanical device that may be coupled to drive the booster compressor 72.

The compressor 72 receives airflow from a low pressure air source 68 and increases pressure of the airflow to an amount required by the pneumatic system 64. In this example, the low pressure air source 68 is disposed within the low pressure compressor 44. Airflow from the low pressure compressor 44 is supplied at an air pressure below that required by the pneumatic system 64. The booster compressor 72 receives air flow from the low pressure source 68 through an inlet 76 and outputs air through an outlet 78 at pressure levels required by the pneumatic system 64. The compressor outlet 78 is in communication with a junction 96 that splits airflow between an outlet passage 80 and an exhaust passage 70. An exhaust valve 82 is disposed within the exhaust passage 70.

The booster compressor 72 operates within a stable range at certain inlet pressures, outlet pressures, and flow rates. The booster compressor 72 may become unstable and provide non-uniform airflow and pressure to the pneumatic system 64 if operated outside of the stable range. It is therefore desirable to operate the booster compressor 72 within a stable operating range at all times regardless of the pressure of the output airflow. However, there is a conflict between the stable operating ranges of the flow multiplier compressor 72 and the flow rate demands of the pneumatic system 64. In some operating conditions, the booster compressor 72 must output airflow at flow rates in excess of those required by the pneumatic system 64. The excess airflow is exhausted through the exhaust passage 70 as facilitated by at least partially opening of an exhaust valve 82.

In operation, there will be some conditions where the booster compressor 72 operates within a stable region such that the output pressures and airflow will match those demanded by the pneumatic system 64. As appreciated, the required flow rates and pressures of the pneumatic system 64 do not always lie within the stable operating space of the flow multiplier compressor 72. The flow-multiplier compressor 72 is desired to be run within a stable range within a range of feasible operating speeds. The variation in airflows and pressures demanded by the pneumatic system 64 result in significant variation of the airflows and outlet pressures required of the compressor 72.

Exhausting of excess airflow through the exhaust passage 70 enables operation of the booster compressor 72 at higher flow rates than demanded by the pneumatic system 64. The exhaust valve 82 controls exhaust excess airflow, such that the airflows communicated to the pneumatic system 64 are always within a range of desired operating conditions.

Figure 3:
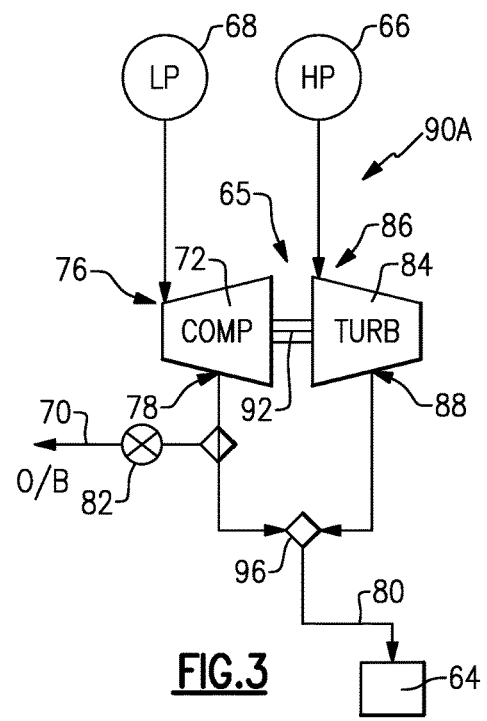
FIG. 3 schematically illustrates another example engine bleed air system embodiment.

Referring to FIG. 3 with continued reference to FIG. 1, another example engine bleed air system is schematically illustrated and indicated at 90a. The engine bleed air system 90a includes a flow-multiplier turbo-compressor 65 that includes a turbine 84 coupled to the booster compressor 72 through a shaft 92. The turbine 84 receives airflow from a high pressure source 66. The high pressure source 66 is typically from a portion of the high pressure compressor 52. Airflow communicated through the turbine 84 is exhausted through an outlet 88 and communicated to a junction 96 that provides for mixing of airflow from the flow multiplier compressor 72. The mixed airflow is then communicated through the outlet passage 80 to the pneumatic system 64. In this example engine bleed air system 90a, the exhaust valve 82 is disposed upstream of the junction 96. The exhaust valve 82 therefore controls airflow communicated to the junction 96 prior to mixing with airflows exhausted from the turbine 84. Exhausting a portion of airflow enables the compressor 72 to operate at higher more stable operating conditions while communicating airflow at pressures demanded by the pneumatic system 64.

Figure 4:
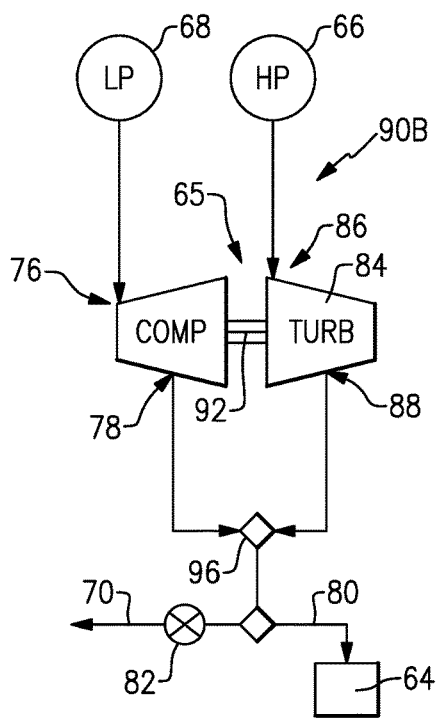
FIG. 4 schematically illustrates another example engine bleed air system embodiment.

Referring to FIG. 4 with continued reference to FIG. 1, another example engine bleed air system is schematically illustrated and indicated at 90b. In the bleed air system 90b, the turbine 84 exhausts airflow to the mixing junction 96. The exhaust valve 82 is disposed downstream of the junction 96 where airflow from the turbine 84 and the booster compressor 72 are mixed. The exhaust valve 82 controls the mixed airflows after the mixing junction 96 and before communication through the outlet passage 80 to the pneumatic system 64. Accordingly, in this embodiment airflow exhausted from both the turbine 84 and the booster compressor 72 are controlled by exhausting airflow after it has been mixed such that airflow through the outlet passage 80 to the pneumatic system 64 remains within desired operating pressures and flows.

Figure 5:
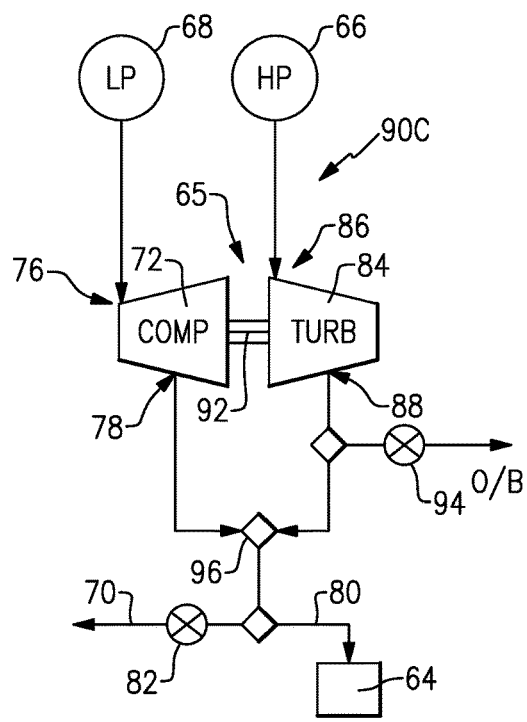
FIG. 5 schematically illustrates yet another engine bleed air system embodiment.

Referring to FIG. 5 with continued reference to FIG. 1, another example bleed air system is schematically illustrated and indicated at 90c. In this example, outlet airflow from the turbine 84 is controlled by a second exhaust valve 94. The second exhaust valve 94 is upstream of the junction 96 and after the turbine outlet 88. By exhausting airflow from the turbine 84 prior to mixing with airflow from the compressor 72, further control is enabled over the airflow and pressure communicated to the pneumatic system 64.

Moreover, the speed at which the turbine 84 operates may also be controlled by exhausting a portion or generating a back pressure of the turbine 84 depending on the airflow and pressure input from the high pressure source 66. Control of the turbine speed provides additional control of the booster compressor 72 and thereby output airflow and pressure communicated to the pneumatic system 64. The example engine bleed air system 90c includes the exhaust valve 82 disposed downstream of the junction 96 after airflows from the turbine 84 and booster compressor 72 are mixed.

Figure 6:
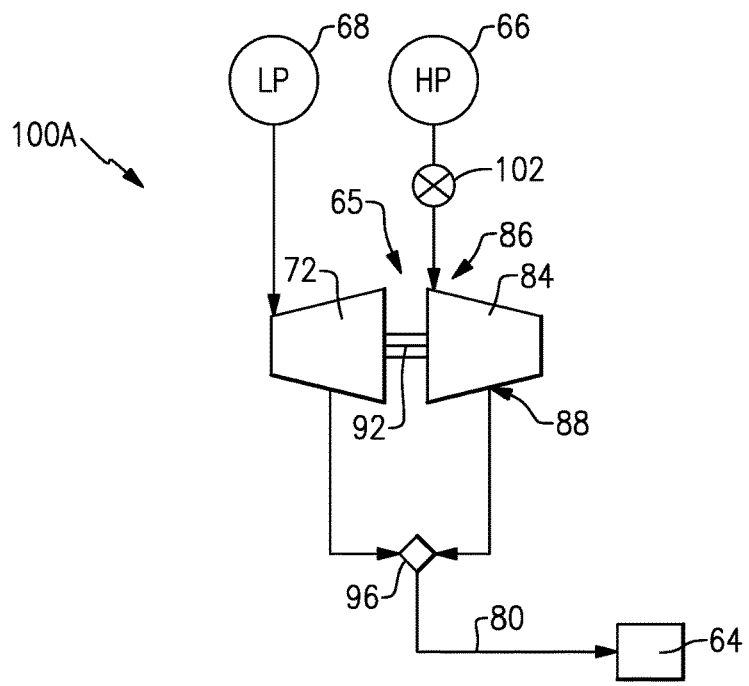
FIG. 6 schematically illustrates an example turbo compressor embodiment.

Referring to FIG. 6 with continued reference to FIG. 1, another example bleed air system embodiment is indicated at 100A and provides control of the turbine 84 with a control valve 102 disposed prior to inlet 86 of the turbine 84. Accordingly, airflow from the high pressure source 66 is metered through the control valve 102 to control operation and speed of the turbine 84. Control of the turbine 84 provides control of output airflow and pressure from the booster compressor 72.

Figure 7:
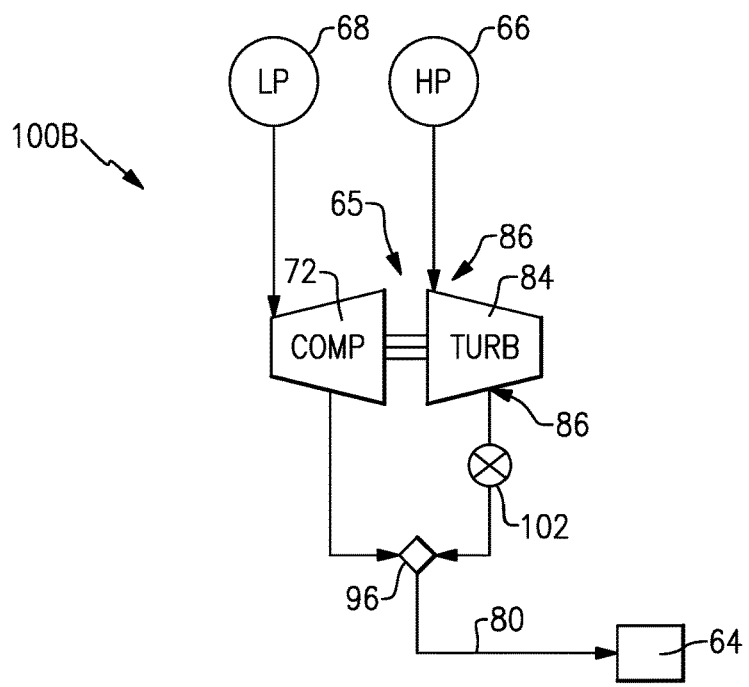
FIG. 7 schematically illustrates yet another turbo compressor embodiment.

Referring to FIG. 7 with continued reference to FIG. 6, another example bleed air system is indicated at 100B and includes the control valve 102 disposed downstream of the turbine 84 prior to the junction 96 where the airflows are mixed. In either location, the control valve 102 functions to control a speed of the turbine 84 in view of the airflows and pressures supplied by the high pressure source 66. The high pressure airflows and pressures from the high pressure source 66 may vary depending on engine operating conditions. This variation can effect operation of the turbine 84 and thereby the output airflows and pressure provided by the compressor 72. Accordingly, the control valve 102 enables control of turbine operation and enables matching output airflow from the compressor 72 with the demand of the pneumatic system 64.

Accordingly, the example engine bleed air system embodiments provide compressor control to enable stable operation while accommodating variations of input airflows and pressures.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising;
    a main engine compressor section disposed axially downstream of an engine fan section and configured to receive airflow from the engine fan section;
    a booster compressor for changing a pressure of airflow received from the main engine compressor section to a pressure desired for a pneumatic system, wherein the booster compressor is configured to operate at airflow conditions greater than a demand of the pneumatic system;
    a turbine coupled to drive the booster compressor, the turbine driven by airflow from the main engine compressor section, wherein airflow exhausted from the turbine is mixed with airflow from an outlet of the booster compressor; and
    an exhaust valve controlling airflow from the outlet of the booster compressor, the exhaust valve located between the outlet of the booster compressor and an outlet passage to the pneumatic system, the exhaust valve is disposed upstream of a junction combining airflow from the booster compressor and the turbine and is operable to exhaust airflow from the booster compressor in excess of the demand of the pneumatic system.

2. The gas turbine engine as recited in claim 1, wherein the main engine compressor section includes a low pressure compressor that communicates airflow to the booster compressor at a pressure less than the demand of the pneumatic system.

3. The gas turbine engine as recited in claim 2, wherein the turbine is driven by airflow from a high pressure compressor separate from airflow supplied to the booster compressor from the low pressure compressor in communication with the booster compressor.

4. The gas turbine engine as recited in claim 3, including a turbine control valve upstream of a turbine inlet for controlling operation of the turbine by controlling airflow communicated to the turbine inlet from the main engine compressor section.

5. A bleed air system for a gas turbine engine, the bleed air system comprising:
  a booster compressor for changing a pressure of airflow received from a main engine compressor section that is downstream of an engine fan to a pressure desired for a pneumatic system, wherein the booster compressor may operate at airflow conditions greater than a demand of the pneumatic system;
  a turbine coupled to drive the booster compressor, the turbine driven by airflow from the main engine compressor section; and
  an exhaust valve controlling airflow between an exhaust outlet of the booster compressor and an outlet passage to the pneumatic system, the exhaust valve disposed upstream of a junction combining airflow from the booster compressor and the turbine and is operable to exhaust airflow from the booster compressor in excess of the demand of the pneumatic system.

6. The bleed air system as recited in claim 5, wherein the main engine compressor section includes a low pressure compressor disposed downstream of a fan, the low pressure compressor communicates airflow to the booster compressor at a pressure less than the demand of the pneumatic system.

7. The bleed air system as recited in claim 6, wherein the turbine is driven by airflow from a high pressure compressor separate from airflow supplied to the booster compressor from the low pressure compressor in communication with the booster compressor.

8. The bleed air system as recited in claim 7, including a turbine control valve upstream of a turbine inlet for controlling operation of the turbine by controlling airflow communicated to the turbine inlet from the main engine compressor section.

9. A method of controlling engine bleed airflow comprising:
  configuring a booster compressor to receive engine bleed air from a main compressor section of a gas turbine engine;
  compressing the engine bleed air from the main compressor section with the booster compressor and supplying compressed engine bleed air to a pneumatic system according to a demand of the pneumatic system;
  mixing airflow from a turbine driving the booster compressor with airflow from the booster compressor and exhausting excess airflow upstream of a junction combining airflow from the booster compressor and the turbine; and
  exhausting airflow in excess of the demand upstream of a junction combining airflow from the booster compressor and turbine through an exhaust valve such that the booster compressor operates at airflows exceeding the demand of the pneumatic system for at least one engine operating condition.

10. The method as recited in claim 9, wherein configuring the booster compressor to receive engine bleed air includes communicating bleed air from a low pressure compressor that receives air from a forward positioned fan section.

11. The method as recited in claim 10, including controlling airflow communicated to turbine driving the booster compressor with a turbine control valve upstream of a turbine inlet and downstream from a high pressure compressor of the gas turbine engine.

* * * * *